United States Patent [19]

Berman

[11] Patent Number: 4,900,133

[45] Date of Patent: Feb. 13, 1990

[54] HEADS-UP DISPLAY COMBINER UTILIZING A CHOLESTERIC LIQUID CRYSTAL ELEMENT

[75] Inventor: Arthur L. Berman, Milpitas, Calif.

[73] Assignee: Kaiser Electronics, San Jose, Calif.

[21] Appl. No.: 263,149

[22] Filed: Oct. 27, 1988

[51] Int. Cl.$^4$ .......................... G02F 1/13; G02B 27/14
[52] U.S. Cl. .................................... 350/346; 350/334; 350/352; 350/174
[58] Field of Search ............... 350/346, 345, 352, 174, 350/334, 169, 171, 3.7, 3.5, 298

[56] References Cited

U.S. PATENT DOCUMENTS

| | | | |
|---|---|---|---|
| 3,679,290 | 7/1972 | Adams et al. | 350/157 |
| 3,697,154 | 10/1972 | Johnson | 350/174 |
| 3,711,181 | 1/1973 | Adams, Jr. et al. | 350/157 |
| 3,915,548 | 10/1975 | Opittek et al. | 350/3.5 |
| 3,957,348 | 5/1976 | Saeva | 350/352 X |
| 4,026,641 | 5/1977 | Bosserman et al. | 350/298 |
| 4,269,475 | 5/1981 | Ellis | 350/174 |
| 4,398,799 | 8/1983 | Swift | 350/174 |
| 4,407,564 | 10/1983 | Ellis | 350/174 |
| 4,447,128 | 5/1984 | Ferrer | 350/174 |
| 4,582,394 | 4/1986 | Boyd | 350/174 |
| 4,600,271 | 7/1986 | Boyer et al. | 350/174 |
| 4,611,877 | 9/1986 | Ellis | 350/174 |
| 4,613,200 | 9/1986 | Hartman | 350/3.7 |

FOREIGN PATENT DOCUMENTS

| | | |
|---|---|---|
| 0154953 | 3/1985 | European Pat. Off. |
| 1321303 | 6/1973 | United Kingdom . |
| 1529227 | 10/1978 | United Kingdom . |
| 2149140 | 10/1984 | United Kingdom . |

OTHER PUBLICATIONS

"Holographic 'Mirror' Helps Fighter Pilots to See", Engineering Materials Design, vol. 31, No. 4, Apr. 1987; p. 15.
Kahn, "Cholesteric Liquid Crystals for Optical Application", Appl. Phys. Letters, vol. 18, No. 6, Mar. 15, 1971, pp. 231–233.
IBM Technical Disclosure Bulletin, "Light Beam Combiner", vol. 15, No. 4, Sep. 1972.
Melamed et al., "Selected Optical Properties of Mixtures of Cholesteric Liquid Crystal", Applied Optics, vol. 10, No. 5, May 1971.
W. A. Shurcliff, "Polarized Light", chapter titled Retarders and Circular Polarizers, Harvard University Press, 1962.
P. G. deGennes, "The Physics of Liquid Crystals", chapter 1 titled Anisotropic Fluids: Main Types & Properties, Clanedon Press, 1974.
Jenkins & White, "Fundamentals of Optics", p. 567, McGraw-Hill, 1976.
D. M. Makow, "Peak Reflectance & Color Gamut of Superimposed Left- and Right-Handed Cholesteric Liquid Crystals", Applied Optics, vol. 19, No. 8, 4/15/1980.
J. Adams et al., "Cholesteric Films as Optical Filters", Journal of Applied Physics, vol. 42, No. 10, Sep. 1971.

Primary Examiner—John S. Heyman
Assistant Examiner—Huy K. Mai
Attorney, Agent, or Firm—Townsend and Townsend

[57] ABSTRACT

A heads-up display (HUD) system employs a cholesteric liquid crystal combiner, an image source, and collimating optics to combine a generated image with an image in an observer's field of view. The cholesteric liquid crystal combiner has a bandwidth, B, around a primary wavelength of maximum reflection, and the image source projects its images within bandwidth B for high efficiency of reflection. Outside bandwidth B the cholesteric combiner has a high efficiency of transmission. Images from the image source are projected upon the combiner which reflects the images toward the observer, together with images from the outside environment in the line-of-sight of the observer. Collimating optics are used to focus the projected images at a distance away from the observer.

9 Claims, 4 Drawing Sheets

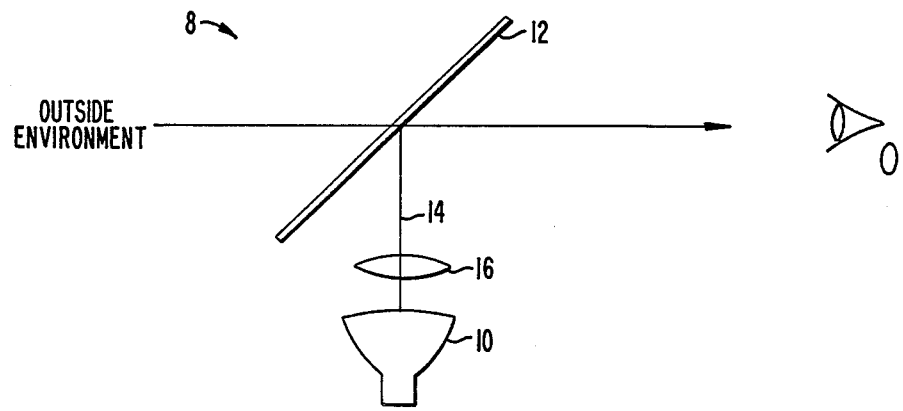
FIG._1.
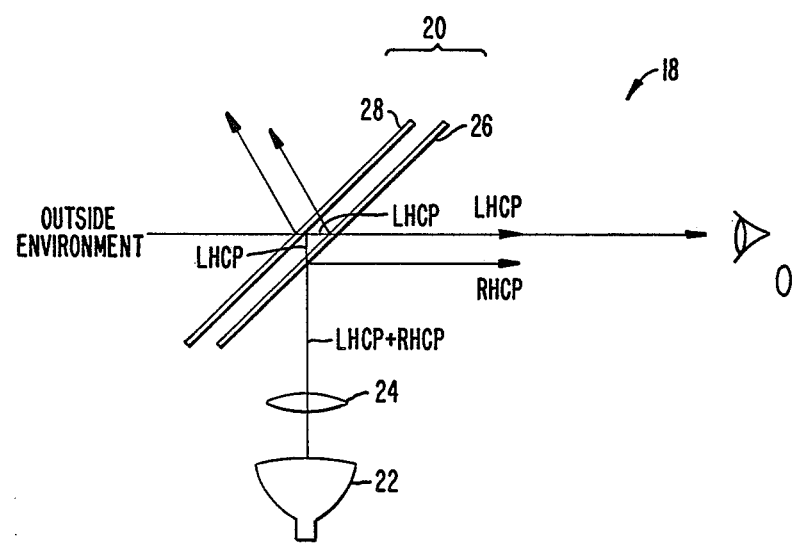
FIG._2.

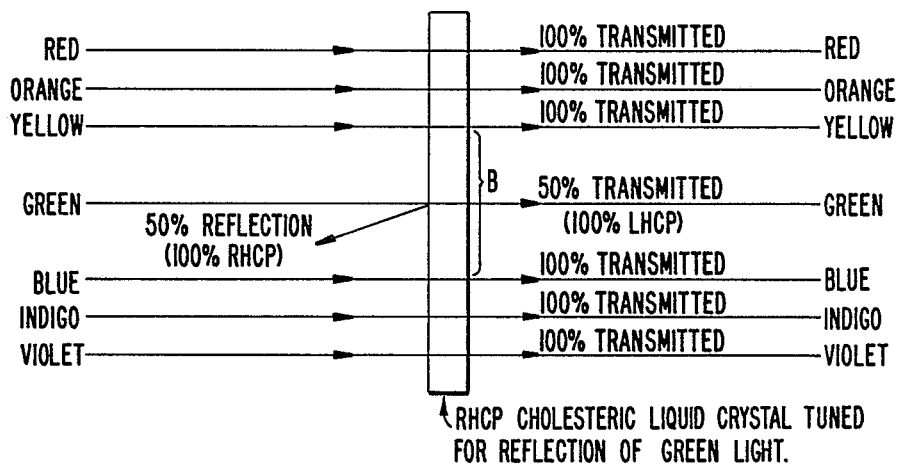
FIG._3a.
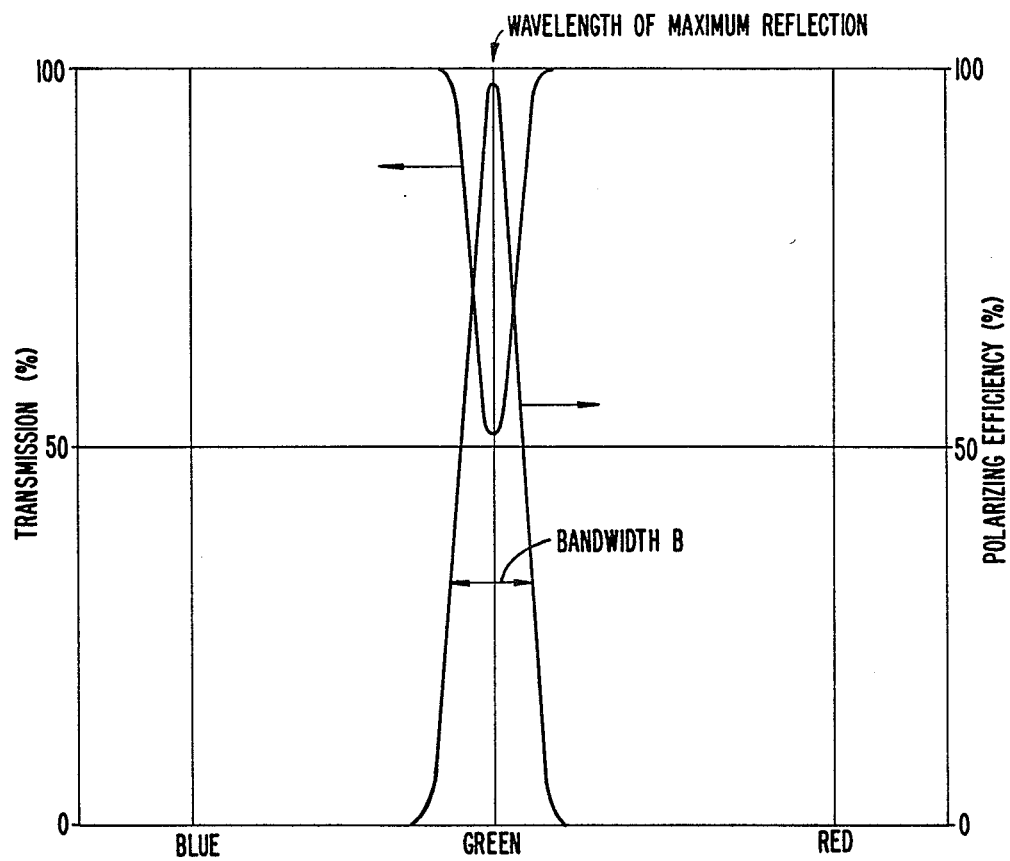
FIG._3b.

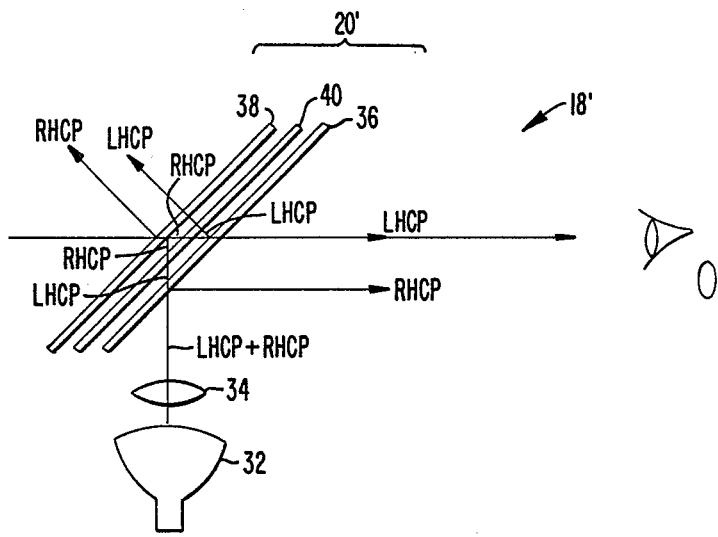
FIG._4.
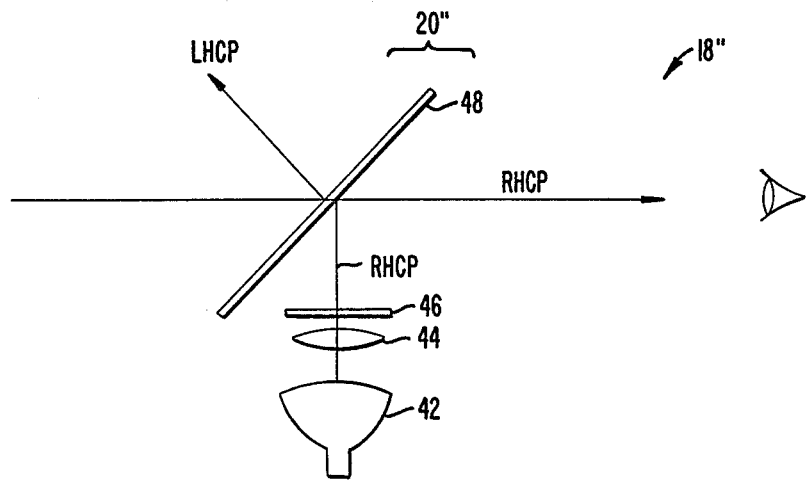
FIG._5.

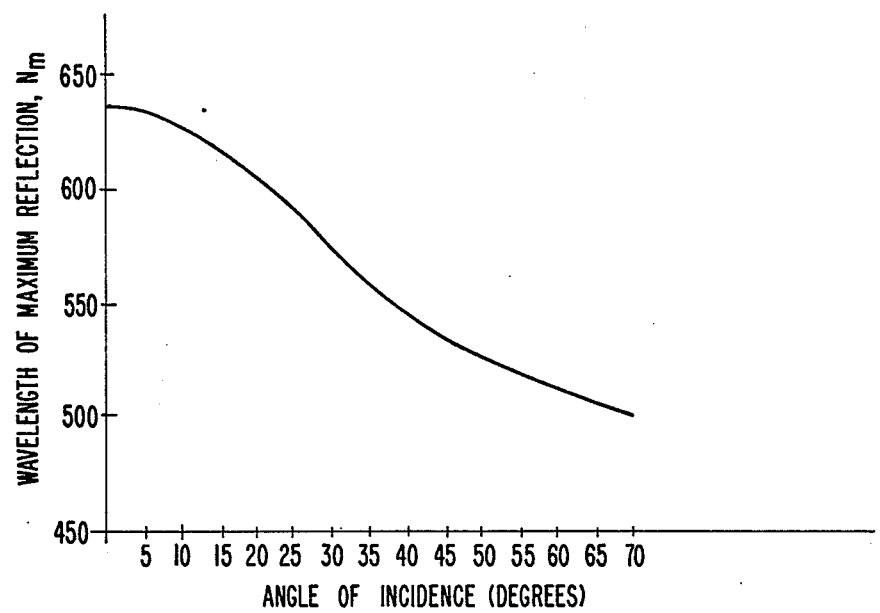
FIG._6.
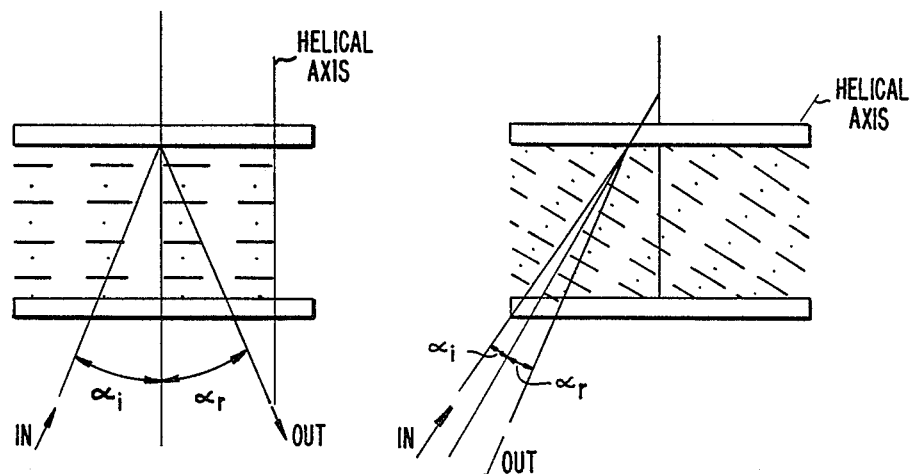
FIG._7a.   FIG._7b.

HEADS-UP DISPLAY COMBINER UTILIZING A CHOLESTERIC LIQUID CRYSTAL ELEMENT

BACKGROUND OF THE INVENTION

1. Field of the Invention

The present invention relates generally to the field of display systems for use in aircraft, flight simulators, and the like, and more particularly to a system which combines a generated image with an image in an observer's line-of-sight by projecting the generated image onto a cholesteric liquid crystal combiner which reflects the projected image toward the observer together with images in the line-of-sight of the observer passing through the combiner.

2. Description of the Prior Art

In aircraft and other vehicles which require nearly continuous attention to both the outside environment and to instrumentation such as control, ordinance, etc., simultaneous viewing of both is desired. To accomplish this simultaneous viewing of both the outside environment and the instrumentation, heads-up displays (hereafter referred to as HUDs) are utilized. Such a typical prior art HUD system 8 is shown in FIG. 1. Typically, HUD systems consist of an instrumentation image source 10, such as a cathode ray tube (CRT), liquid crystal display (LCD), or similar display, an image combiner 12, and optics 16 for collimating the image. The combiner is usually angled relative to the line-of-sight plane of the observer so that the projected image in the image source plane is reflected into the line-of-sight plane of the observer. The observer views the outside environment through the combiner together with the projected instrumentation image, which appears as a virtual image focussed at infinity. Thus, the instrumentation image is, in effect, superimposed on the observer's view of the outside environment.

Presently, combiners fit into one of two categories semi-reflective combiners, and holographic combiners. Semi-reflective combiners are generally composed of a body of light-transmissive material, such as glass, having flat or selectively curved faces, one such face (usually that facing the observer) being provided with a semi-reflective thin-film coating of aluminum, silver, etc.

Light incident on a semi-reflective combiner from one direction is transmitted through it, and light incident on the combiner from the opposite direction is reflected by it. However, both absolute transmission and reflection is not possible. That is, to facilitate transmission of images from the outside environment through the combiner some degree of reflectivity of the projected images by the combiner must be sacrificed, and vice-versa. For this reason, semi-reflective mirrors as combiners have relatively poor transmissivity of images from the outside environment, and low contrast of the projected images as against the images from the outside environment. Further, aluminum coatings oxidize, silver coatings tarnish, etc., so that transmissivity and reflectivity tend to decrease with age of the combiner, especially at the shorter wavelengths. A typical semi-reflective mirror combiner will, at best, transmit approximately 75% of the light from the outside environment, while reflecting approximately 25% of the light comprising the projected image to the observer.

Holographic combiners generally consist of, in addition to an image source, diffraction optics in varying complexity. The diffraction optics serve as a combiner, and typically include a layer of photosensitive organic material such as a dichromated gelatin or photographic emulsion having a diffraction grating recorded thereon. This layer is sandwiched between two layers of glass which provide structural support and protect it from physical damage. Under the principal of Bragg diffraction, the diffraction grating will diffract and reflect light in a selected bandwidth, and transmit light outside the selected bandwidth.

In operation, the holographic combiner is placed in the line-of-sight plane of an observer. All images from the outside environment in the line-of-sight plane of the observer, except for those at the diffraction/reflection wavelength, pass through the combiner. Those images at the diffraction/reflection wavelength are reflected away from the observer. A projected image at the diffraction/reflection wavelength of the diffraction grating, incident upon the combiner, is reflected in the line-of-sight plane of the observer so as to appear superimposed on the images from the outside environment.

The holographic combiner works on the principal of exposed recording media, namely utilizing the photosensitive layer. Recorded on the media is a matrix of exposed images of dots, or a grid of lines. Light incident upon the recorded images (i.e., the matrix or grid) is reflected by the holographic combiner. The light striking the holographic combiner between the recorded images passes through it undiffracted and unreflected. This implies that holographic combiners have less than absolute reflectivity. Further, light from the outside environment is filtered by the holographic combiner such as to reduce its transmission, due to the fact that the photosensitive layer is not perfectly transmissive. In effect, typical holographic combiners transmit between 70% and 80% efficiency, while reflecting projected images at between 70% and 80% efficiency.

Low transmissivity and reflectivity of the combiner is undesirable, especially in low visibility operating conditions such as at night or in inclement weather. Further, in flight simulator applications and the like it is crucial to keep the required brightness of images generated in the trainee's line-of-sight plane to a minimum in order to minimize the cost of operation and maximize the life-span of simulator image projection equipment.

Thus, there is a present need in the art for a combiner with higher transmissivity of images from the outside environment, simulator images, etc., and further with higher reflectivity of projected images such as instrumentation, etc., while maintaining the weight, complexity and cost of the optics to a minimum.

SUMMARY OF THE INVENTION

The present invention is directed to an HUD combiner that utilizes the properties of cholesteric liquid crystals to superimpose projected images upon images in the observer's line-of-sight. The combiner of the present invention thereby provides a high transmissivity of images in the line-of-sight plane of the observer, together with a high reflectivity of images projected upon it, not heretofore obtained.

According to a preferred embodiment of the present invention, a combiner for an HUD system is formed with two flat cholesteric liquid crystal elements, each reflective to light within a certain bandwidth having opposite rotary sense. A CRT and collimating optics are positioned to project images, representing instrument readings, for example, upon the combiner in such a way as to be reflected into the line-of-sight plane of the observer. The combiner is placed in the line-of-sight plane of the observer so that images from the CRT, reflected into the line-of-sight of the observer, appear superimposed upon images from the outside environment, simulator, etc.

The combiner for an HUD system according to the present invention provides higher transmissivity of images from the outside environment, and higher reflectivity of projected images, such as instrumentation, than heretofore provided by the prior art. Further, weight, complexity of the components, and cost are reduced over the prior art.

BRIEF DESCRIPTION OF THE DRAWINGS

FIG. 1 illustrates a prior art HUD system with combiner.

FIG. 2 illustrates a HUD system according to one embodiment of the present invention utilizing dual cholesteric liquid crystal elements.

FIG. 3(a) illustrate the transmission characteristics of a cholesteric liquid crystal element reflective to RHCP green light.

FIG. 3(b) is a graph of transmission and polarization efficiency of a cholesteric liquid crystal element.

FIG. 4 illustrates an HUD system according to one embodiment of the present invention utilizing dual cholesteric liquid crystal elements and a half-wave-length filter.

FIG. 5 illustrates an HUD system according to another embodiment of the present invention utilizing a single cholesteric liquid crystal element and circular polarizing filter.

FIG. 6 is a graph illustrating the angular dependence of the wavelength of maximum reflection.

FIGS. 7(a) and 7(b) illustrate the biasing of the reflection angle from the cholesteric liquid crystal element through the use of surface tilt, untilted and tilted cases, respectively.

DETAILED DESCRIPTION OF THE PREFERRED EMBODIMENT(S)

With reference to FIG. 2, a preferred embodiment of an HUD system 18, utilizing cholesteric liquid crystal combiner 20 according to the present invention, is shown. As illustrated, HUD system 18 includes combiner 20, together with an image source 22, and collimating optics 24.

Combiner 20, in the preferred embodiment, comprises first and second cholesteric elements 26 and 28, respectively. First cholesteric liquid crystal element 26 is tuned to reflect right hand circular polarized (RHCP) light in a bandwidth, B, around 540 Nm (i..e, green light), and second cholesteric liquid crystal element 28 is tuned to reflect left hand circular polarized (LHCP) light in that same bandwidth, B. That is, first cholesteric liquid crystal element 26 is reflective to images that are RHCP and in the bandwidth B and transmissive to all other images, and second cholesteric liquid crystal element 28 is reflective to images that are LHCP and in the bandwidth B. First and second cholesteric elements 26, 28 are, in one embodiment, separate elements, and positioned roughly parallel to one another. However, other embodiments of the present invention will have first and second cholesteric elements 26, 28 joined as one element, or oriented a parallel to one another, dependent on the intended application.

Image source 22 may be a cathode ray tube (CRT), liquid crystal display (LCD), or other type of display. In general, image source 22 is capable of generating images of instrumentation, for example aircraft altitude, bearing, fuel reserve level, gun-sights, etc. Image source 22 is preferably a green CRT having a phosphor coating, P43 or P53 for example, with a narrow bandwith of transmission centered around 540 Nm. The brightness of image source 22 must be sufficient to be perceived by an observer, symbolized by an eye labelled O, after reflection, but due to the high reflectivity of a combiner constructed according to the present invention, the brightness of image source 22 may be kept to a minimum.

Collimating optics 24 may consist of various lenses, etc., and will be arranged as a function of the relative positions of combiner 20, image source 22, and observer O. The effect of collimation is to focus the images from image source 22 at some distance in the line-of-sight plane of observer O. For aircraft HUD applications, a collimated focus between 40 feet and infinity is preferred.

HUD system 18 is positioned in an aircraft cockpit, or similar location, such that combiner 20 lies between the outside environment and observer O, in the plane of the observer's line-of-sight. Collimating optics 24 are positioned between combiner 20 and image source 22. Image source 22 is positioned such that images generated thereby are incident on, and reflected by, combiner 20 into the line-of-sight plane of observer O.

To better enable a comprehensive understanding of the functioning of the present invention, a brief description of cholesteric liquid crystal elements may be beneficial.

Cholesteric liquid crystals of the type employed in the present invention exhibit a number of unique properties with regard to light incident upon them. Specific to the present invention are several properties of such liquid crystals, explained with reference to FIGS. 3(a) and 3(b). A cholesteric liquid crystal element (or cholesteric element) is substantially transparent to all wavelengths of electromagnetic radiation, specifically visible light, except that within a narrow bandwidth, B, around a selected primary wavelength, for example 540 Nm (i.e., green), as shown in FIG. 3(a). Within bandwidth B, light of one rotary sense (LHCP or RHCP) incident upon the cholesteric element from either direction is reflected by the cholesteric element. By convention, a cholesteric element which is reflective to right-hand circular polarized light is said to be a right-hand circular polarized (or right-handed) cholesteric element. Conversely, a cholesteric liquid crystal element which is reflective to left-hand circular polarized light is said to be a left-hand circular polarized (or left-handed) cholesteric element. See Adams, et al., CHOLESTERIC FILMS AS OPTICAL FILTERS, "Journal of Applied Physics," Vol. 42, no. 10 (1971).

Further, light reflected by the cholesteric element maintains original rotary sense (i.e., does not change handedness). For example, RHCP light reflected by a cholesteric element is reflected as RHCP light. This is counter to the general case of other surfaces, where reflection is accompanied by a change of rotary sense (i.e., RHCP light incident upon a reflective surface is reflected as LHCP light).

The same is true with respect to transmission of light through a cholesteric element. Light of a first rotary sense passing through a cholesteric element maintains that first rotary sense. For example, RHCP light passing through a left-handed cholesteric element remains RHCP.

As FIG. 3(b) illustrates, cholesteric elements have very high transmissivity and reflectance around the primary wavelength. A cholesteric element is capable of achieving transmission of 90% for all light except that of one rotary sense within the bandwidth, B, around the primary wavelength, for which light the element is capable of 90% reflection. In HUD applications, this provides the observer with acute visibility of images of the outside environment, transmitted through the cholesteric element, combined with high-contrast projected symbology, reflected off the element.

Operation of HUD system 18 according to a preferred embodiment of the present invention will now be described with reference to FIG. 2. Observer O is positioned to receive images from the outside environment through combiner 20. Green light emitting from image source 22, of equal parts LHCP and RHCP, is collimated by collimating optics 24, and caused to be incident upon first cholesteric element 26. The RHCP portion of light incident upon first cholesteric element 26 is reflected into the line-of-sight plane of observer O, while the LHCP portion of the light is transmitted unattenuated by first cholesteric element 26 and caused to be incident upon second cholesteric element 28. The LHCP light incident upon second cholesteric element 28 is reflected into the line-of-sight plane of observer O by second cholesteric element 28, passing unattenuated through first cholesteric element 26.

All images from the outside environment in the line-of-sight plane of observer O not within bandwidth B are transmitted through first and second cholesteric elements 26, 28 to observer O. Those images within bandwidth B which are LHCP are reflected away from observer O by second cholesteric element 28, and those which are RHCP are reflected away from observer O by first cholesteric element 26.

Because cholesteric elements exhibit high transmissivity, better viewing of images of the outside environment is provided. Further, since cholesteric elements are reflective to light within a selected bandwidth incident upon them from either direction, images from the outside environment within the reflective bandwidth are reflected away from observer O. Thus, the projected images within the bandwidth B have a higher contrast as against images from the outside environment. Consequently, image source 22 need be of a lower power than that used in the prior art. This lowers the cost and complexity of HUD system 18.

With reference to FIG. 4, another embodiment of the present invention is shown. In this embodiment, HUD system 18' consists of an image source 32, similar to that described above, collimating optics 34, again as described above, and combiner 20', comprising first and second cholesteric elements 36 and 38 respectively. Between first and second cholesteric elements 36, 38 is positioned half wavelength filter 40. First and second cholesteric elements 36, 38 are formed to be RHCP, both having a bandwidth, B, of reflection centered around 540 Nm (green light). First and second cholesteric elements 36, 38, and halffl-wavelength filter 40 are positioned in the line-of-sight plane of observer O, and further in the path of incidence of image source 32.

In operation, green light emitting from image source 32, of equal parts LHCP and RHCP, is collimated by collimating optics 34 and caused to be incident upon first cholesteric element 36. RHCP light incident upon first cholesteric element 36 is reflected into the line-of-sight plane of observer O, while LHCP light is transmitted unattenuated by first cholesteric element 36 and caused to be incident upon half-wavelength filter 40. Light passing through half-wavelength filter 40 is caused to reverse its rotary sense (i.e., LHCP light is reversed to RHCP light). Light passing through half-wavelength filter 40 is caused to be incident upon second cholesteric element 38, which reflects the now RHCP light into the line-of-sight plane of observer O. Intermediate to reaching observer O, the light reflected by second cholesteric element 38 passes once more through halfwavelength filter 40, undergoing a second reversal of rotary sense (i.e., RHCP to LHCP), so as to pass unattenuated through first cholesteric element 36 to observer O.

Since the optical properties of a cholesteric element are directly dependent on the temperature of the cholesteric liquid crystal material, the embodiment as detailed above (FIG. 4) uses two identical cholesteric elements to minimize the effects of temperature shifts on the optical performance of the combiner. Properties such as the dependence of the reflected wavelength on the angle of incidence (further discussed below) can also be better controlled when identical cholesteric elements are used.

As detailed in FIG. 5, another embodiment of an HUD system 18" according to the present invention has a combiner 20" comprised of a single cholesteric element 48, tuned to reflect green RHCP light, and located in the line-of-sight plane of observer O. HUD system 18" further comprises image source 42, collimating optics 44, and circular polarizing filter 46. This embodiment is most commonly used in situations where image source 42 is provided with a polarizing filter to reduce reflection from external light, such as sunlight.

In operation, light emitting from image source 42, which is RHCP is collimated by collimating optics 44, and transmitted to cholesteric element 48 by circular polarizing filter 46. Light which is LHCP, on the other hand, is substantially entirely filtered out by circular polarizing filter 46. Thus, images projected upon cholesteric element 48 by image source 42 are predominantly RHCP, and consequently reflected by cholesteric element 48 so as to be combined with images passing through cholesteric element 48 from the outside environment.

In general to those skilled in the art to which this invention relates, many changes in construction and widely differing embodiments and applications of the present invention will suggest themselves without departing from its spirit and scope. For example, the composition of the cholesteric combiner may be such that it has a bandwidth of maximum reflection centered at a wavelength other than 540 Nm. Likewise, the bandwidth of maximum reflection around the primary wavelength may be varied as a function of the cholesteric liquid crystal's composition.

Further, the physical arrangement of components of the invention may be varied with specific results. For example, relying on another property of cholesteric elements, as demonstrated in FIG. 6, that the wavelength of maximum reflection is angular sensitive (i.e., as the angle of incidence increases, the wavelength of maximum reflection is shifted toward the shorter wavelengths) the wavelength of maximum reflection of the cholesteric liquid crystal element for normally incident light may be increased to compensate for the shift toward the shorter wavelengths of reflection for non-normally incident light.

Another property of cholesteric elements, demonstrated in FIGS. 7(a) and 7(b), is that the separation between the angle of incidence $i$ and angle of reflection $r$ is a function of the orientation, or tilt, of the helical axis of the cholesteric layer. As the helical axis of the cholesteric layer. As the helical axis is tilted away from normal to the surface of the cholesteric liquid crystal element the separation becomes smaller. Thus, positioning of the reflected image in the line-of-sight of the observer may be controlled by the composition of the element (as opposed to positioning of the image source).

Thus, the disclosures and descriptions herein are purely illustrative, and are not intended to be in any sense limiting.

What is claimed is:

1. An apparatus for positioning images in an observer's line-of-sight, wherein projected images from an image source are reflected by a liquid crystal element acting as a combiner to combine the projected images with images in the line-of-sight of the observer, comprising:
   an image source, having selected primary wavelengths, for projecting symbology; and
   a liquid crystal element reflective to images at said selected primary wavelengths, and transmissive to images at all other wavelengths.

2. An apparatus for positioning an image in an observer's line-of-sight, wherein a projected image, from an image source, having a first rotary sense if projected in an image source plane, and reflected by a liquid crystal element placed at the intersection of a line-of-sight plane and said image source plane, the liquid crystal element acting as a combiner to combine the projected image with an image in the line-of-sight plane, comprising:
   an image source, having a primary wavelength range, for projecting an image; and
   a first liquid crystal element reflective to an image having said first rotary sense within said primary wavelength range, and transmissive to an image having a second rotary sense, opposite said first rotary sense within said primary wavelength range and to an image at all wavelengths outside said primary wavelength range.

3. The apparatus as claimed in claim 2, further comprising means in said image source plane for collimating said projected image in said image source plane.

4. The apparatus as claimed in claim 2, further comprising a second liquid crystal element proximate said first liquid crystal element, in said image source and line-of-sight planes, and opposite said image source from said first liquid crystal element, reflective to an image having said second rotary sense within said primary wavelength range, and transmissive to an image having said first rotary sense within said primary wavelength range and to an image at any wavelength outside said primary wavelength range, which is capable of reflecting said projected image within said primary wavelength range without reversal of said image's rotary sense, for combining said projected image with an image in said line-of-sight plane.

5. The apparatus as claimed in claim 2, further comprising a second liquid crystal element proximate said first liquid crystal element, in said image source and line-of-sight planes, and opposite said image source form said first liquid crystal element, reflective to an image having said first rotary sense within said primary wavelength range, and transmissive to an image having said second rotary sense within said primary wavelength range and to an image at any wavelength outside said primary wavelength range, which is capable of reflecting said projected image within said primary wavelength range without reversal of said image's rotary sense, for combining said projected image with an image in said line-of-sight plane, and further comprising a half-wavelength filter located between said first and second liquid crystal elements for reversing the rotary sense of a projected image transmitted therethrough.

6. An apparatus for positioning images in an observer's line-of-sight, comprising:
   an image source for producing an image within a primary wavelength range, located in an image source plane, and further for projecting said image upon a line-of-sight plane;
   collimating means in said image source plane for collimating said projected image; and
   a first cholesteric liquid crystal element located at the intersection of said image source plane and said line-of-sight plane reflective to an image having said first rotary sense within said primary wavelength range and transmissive to an image having a second rotary sense, opposite said first rotary sense, within said primary wavelength range, and to an image having either said first or said second rotary senses at any wavelength outside said primary wavelength range, for combining said projected image with an image in said line-of-sight plane.

7. A method for positioning an image in an observer's line-of-sight, comprising the steps of:
   positioning in a line-of-sight plane a liquid crystal element reflective to an image having a first rotary sense within a selected range of wavelengths, transmissive to an image having a second rotary sense opposite said first rotary sense within said selected range of wavelengths and transmissive to an image having either said first or said second rotary senses outside said selected range of wavelengths; and
   projecting an image within said selected range of wavelengths to be combined with an image in said line-of-sight plane from an image source such that said projected image is reflected by said liquid crystal element toward the observer in said line-of-sight plane together with said image in said line-of-sight plane.

8. A method for positioning an image in an observer's line-of-sight, comprising the steps of:
   positioning in a line-of-sight plane a first liquid crystal element reflective to an image having a first rotary sense within a selected range of wavelengths, transmissive to images having a second rotary sense opposite said first rotary sense within said selected range of wavelengths and transmissive to images having either said first or said second rotary senses outside said selected range of wavelengths;
   positioning proximate said first liquid crystal element and in said line-of-sight plane a second liquid crystal element having high reflectivity to an image within said selected range of wavelengths and having said second rotary sense and high transmissivity to images within said selected range of wavelengths and having said first rotary sense and to images outside said selected range of wavelengths; and projecting an image within said selected range of wavelengths comprising components in equal amounts of said first and second rotary senses to be combined with an image in said line-of-sight plane from an image source such that a component of said projected image having said first rotary sense is reflected by said first liquid crystal element toward the observer in said line-of-sight plane together with said image in said line-of-sight plane, and such that that component of said projected image having said second rotary sense is transmitted through said first liquid crystal element without reversal of said component's rotary sense to said second liquid crystal element which reflects said component having said second rotary sense without reversal of said component's rotary sense to said first liquid crystal element which transmits said component without reversal of said component's rotary sense toward the observer in said line-of-sight plane together with said image in said line-of-sight plane.

9. A method for positioning an image in an observer's line-of-sight, comprising the steps of:

positioning in a line-of-sight plane first and second liquid crystal elements proximate one another, each reflective to an image having a first rotary sense within a selected range of wavelengths and transmissive to an image having a second rotary sense opposite said first rotary sense within said selected range of wavelengths and to an image having either said first or said second rotary senses outside said selected range of wavelengths;

positioning between said first and second liquid crystal elements a half-wavelength filter; and projecting an image within said selected range of wavelengths comprising components in equal amounts of said first and second rotary senses to be combined with an image in said line-of-sight plane from an image source such that a first component of said projected image having said first rotary sense is reflected by said first liquid crystal element toward the observer in said line-of-sight plane together with said image in said line-of-sight plane, and such that a second component of said projected image having said second rotary sense is transmitted by said first liquid crystal element, without reversal of said second component's rotary sense, to said-wavelength filter, which reverses said second component's rotary sense, from said first rotary sense to said second rotary sense, and transmits said second component to said second liquid crystal element which reflects said second component, without reversal of said second component's rotary sense, into said line-of-sight plane and to said half-wave-length filter which reverses said second component's rotary sense, from said second rotary sense to said first rotary sense, and which transmits said second component to said first liquid crystal element which transmits said second component, without reversal of said second component's rotary sense, toward the observer in said line-of-sight plane together with said image in said line-of-sight plane.

* * * * *